United States Patent
Kozhaya et al.

(10) Patent No.: US 11,564,063 B2
(45) Date of Patent: Jan. 24, 2023

(54) INTELLIGENT DYNAMIC COMMUNICATION HANDOFF FOR MOBILE APPLICATIONS

(71) Applicant: INTERNATIONAL BUSINESS MACHINES CORPORATION, Armonk, NY (US)

(72) Inventors: Joseph Kozhaya, Morrisville, NC (US); Ryan Anderson, Kensington, CA (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 17/094,906

(22) Filed: Nov. 11, 2020

(65) Prior Publication Data
US 2022/0150666 A1  May 12, 2022

(51) Int. Cl.
*G06F 15/16* (2006.01)
*H04W 4/029* (2018.01)
*H04W 64/00* (2009.01)

(52) U.S. Cl.
CPC ......... *H04W 4/029* (2018.02); *H04W 64/003* (2013.01); *H04W 64/006* (2013.01)

(58) Field of Classification Search
CPC .. H04W 4/029; H04W 64/003; H04W 64/006
See application file for complete search history.

(56) References Cited

U.S. PATENT DOCUMENTS 6,385,454 B1 * 5/2002 Bahl ............... H04W 28/26
455/452.2
7,457,267 B1 * 11/2008 O'Neill ............ H04W 36/02
370/332

(Continued)

FOREIGN PATENT DOCUMENTS

| CN | 114553713 A | 5/2022 |
| JP | 2022077504 A | 5/2022 |
| WO | 2017014802 A1 | 1/2017 |

OTHER PUBLICATIONS

Chowdhury, et al., "6G Wireless Communication Systems: Applications, Requirements, Technologies, Challenges, and Research Directions," ArVix.org [Draft], Sep. 25, 2019, pp. 1-12. <https://arxiv.org/abs/1909.11315> <arXiv:1909.11315v1 [cs.NI]>.

(Continued)

*Primary Examiner* — Phuoc H Nguyen
(74) *Attorney, Agent, or Firm* — David Spalding

(57) ABSTRACT

Microservices are predictively deployed on edge devices in a network. An application is run on a client device, the application comprising a set of microservices runnable on any edge device in a set of two or more edge devices. A state of the client device at a first time is determined, the state including one or more microservices currently being run for the client device, and for each microservice currently being run, an edge device running the microservice. One or more microservices that are likely to be run at a second time subsequent to the first time and a location of the client device at the second time are predicted. Based on the predicted location, a next edge device in the set of edge devices is determined for running the one or more microservices predicted to be run at the second time.

25 Claims, 7 Drawing Sheets

(56) References Cited

U.S. PATENT DOCUMENTS

| | | | | |
|---|---|---|---|---|
| 8,620,319 | B1* | 12/2013 | Thandu | H04W 48/02 |
| | | | | 455/448 |
| 9,998,434 | B2 | 6/2018 | Verzun et al. | |
| 10,491,575 | B2 | 11/2019 | Verzun et al. | |
| 2004/0236826 | A1* | 11/2004 | Harville | H04L 65/1101 |
| | | | | 709/203 |
| 2005/0176440 | A1* | 8/2005 | Sang | H04W 36/22 |
| | | | | 455/453 |
| 2008/0233958 | A1* | 9/2008 | Robbins | H04W 36/32 |
| | | | | 455/436 |
| 2008/0259869 | A1 | 10/2008 | Wang | |
| 2009/0232098 | A1* | 9/2009 | Makabe | H04W 36/00835 |
| | | | | 370/332 |
| 2016/0337913 | A1 | 11/2016 | Kampmann | |
| 2017/0034703 | A1 | 2/2017 | Dimatteo, III | |
| 2018/0234901 | A1* | 8/2018 | Suh | H04W 36/32 |
| 2020/0359290 | A1* | 11/2020 | Watson | H04B 17/327 |

OTHER PUBLICATIONS

Hatch, et al., "Method for Improved Bandwidth Utilization in Data Downloading Systems Using Intelligent Dynamic Connection Limit Stepping," ip.com, ip.com No. IPCOM000251425D, Oct. 30, 2017, pp. 1-9.

Mell, et al., "The NIST Definition of Cloud Computing", National Institute of Standards and Technology, Special Publication 800-145, Sep. 2011, pp. 1-7.

Pham, et al., "A Survey of Multi-Access Edge Computing in 5G and Beyond: Fundamentals, Technology, Integration and State-of-the-Art," IEEE Communications Surveys and Tutorials, Jan. 2, 2020, pp. 1-43. <https://arxiv.org/pdf/1906.08452.pdf> < arXiv:1906.08452v2 [cs.NI]>.

* cited by examiner

INTELLIGENT DYNAMIC COMMUNICATION HANDOFF FOR MOBILE APPLICATIONS

BACKGROUND

Embodiments relate generally to wireless communications, and more particularly to methods for predictively deploying software microservices to edge nodes (or edge devices) to enable rapid communication handoffs in a wireless network.

Wireless networking systems have become a prevalent means to communicate with others worldwide and engage with content. Wireless communication devices, such as cellular telephones, tablet computers, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

One of the most challenging requirements for a wireless network to be ubiquitous is the ability to permit mobility, whenever and wherever, without loss of quality of service and connectivity. Such mobility support allows users, with different mobility profiles, to traverse different geographical areas while continuing to access a variety of mobile applications. A central component of supporting mobility management are handover mechanisms. In cellular telecommunications, the terms handover or handoff refer to the process of transferring an ongoing call or data session from one channel connected to the core network to another channel. In satellite communications, it is the process of transferring satellite control responsibility from one earth station to another without loss or interruption of service. Handover mechanisms allow a user to change the physical point of attachment within the mobile network when certain preprogrammed conditions are satisfied. For example, if the received signal power from the current base station serving the user goes below a particular threshold and, simultaneously, the received signal power for another base station nearby goes above a certain threshold, then a decision to change the point of attachment, i.e., the base station, can be made by the devices in the network infrastructure in concert with the user device.

The worldwide mobile network infrastructure is in the midst of a transition to what is known as 5G, or fifth generation, technology. As compared to the current network scenario, the future 5G network scenarios will be much more complex. Contributing towards this increased network complexity will be the burgeoning demand for high quality data by users and devices, which are also expected to increase in numbers exponentially. There will also be technologically diverse applications, e.g., Virtual Reality (VR), Augmented Reality (AR), gaming, messaging, video playback, that go well beyond the traditional "voice and data" application commonly used today. There will be a variety of radio access technologies, i.e., 5G New Radio, LTE, 3G, 2G, Wi-Fi, and a wide range of mobility profiles, including for example users on high speed trains, airplanes, cars or walking. The complexity of the 5G network is further exacerbated by all of these factors, not to mention the addition of new spectrum bands, e.g., millimeter wave frequencies, that will be utilized and behave much differently than the traditional spectrum bands of earlier mobile network generations.

In such an environment, existing static techniques for communication handoff may struggle with workload variances, resulting in loss of continuity of computing and connectivity—and ultimately resulting in poor user experience. For instance, in the current mobile network scenario, the network has significant time to trigger, prepare, execute and complete a handover. However, the same is not true for the future network, where the density of access points will be high, i.e., access points with smaller coverage areas and higher bandwidths will be packed more closely in a given area. In addition, macro-cells with significantly large coverage areas will be present to assist the small cells. If current handover mechanisms as described above were used, the time to complete the handover could be much greater than the time the user may be present at the desired base station while the conditions are still favorable to establish a link. If the time available to perform the resource allocation and negotiation process is shorter, loss of connectivity is a higher risk with the established handover mechanisms, and this could result in poor network performance. The handover signaling overhead will also be of critical importance in the context of network performance because of the failures caused by cell densification and also the presence of diverse radio access technologies, i.e., potentially many handoffs between 4G LTE and older technologies such as Wi-Fi. Therefore, optimizing the handover process, where the latency and signaling overhead are reduced, will be an extremely vital component of future handover management strategies.

For example, consider the scenario of an AR gaming application that requires players to move from one location to another over a large physical area equipped with AR markers while engaging in combat virtually within the game. As players move quickly from one physical location to another, their communication with the gaming servers, whether the servers are in a central location (also known as the "cloud") or closer to the user at the network edge, will need to be enabled via quick handoff from one network repeater to another. As described above, existing handover mechanisms may be too slow to handle the dynamic nature of player movements and the corresponding need for high bandwidth and high computing resources.

The 5G wireless network also lends itself to what is known as an edge computing model. Edge computing is a distributed computing framework in which information processing is located close to the network edge, which is where things and people produce or consume that information. Edge computing brings computation and data storage closer to the devices where it's being gathered, rather than relying on a central location that can be thousands of miles away, resulting in a more decentralized environment, just as described above for 5G wireless networks.

Edge computing was developed because of the exponential growth of internet-enabled devices such as autonomous vehicles or everyday devices within the home such as security cameras or thermostats or, in a commercial setting, automated devices in a manufacturing line. These devices now use the network for either receiving information from the cloud or delivering data back to the cloud. Many of these "edge devices" generate enormous amounts of data during the course of their operations. As examples, consider devices that monitor manufacturing equipment on a factory floor, or an Internet-connected video camera that sends live footage from a remote office. While a single device producing data can transmit it across a network quite easily, problems arise when the number of devices transmitting data at the same time grows. Instead of one video camera transmitting live footage, hundreds or thousands of devices may be sending or receiving data, resulting in a potential loss of quality due to latency and tremendous bandwidth costs.

Edge computing hardware and services help solve this problem by being a local source of processing and storage for many of these systems. An edge server, for example, may process data from an edge device, and then send only the relevant data back through the cloud, reducing bandwidth needs, or it may send data back to the edge device in the case of real-time application needs. These edge devices may include many different things, such as a smart thermostat, an employee's notebook computer, their latest smartphone, the security camera or even the internet-connected microwave oven in the office break room. Edge servers themselves and even the network repeaters that are installed in 5G networks, e.g., cell towers, microcells, and Wi-Fi access points, may be considered edge devices within the edge computing infrastructure.

In tandem with the 5G wireless infrastructure and the edge computing model, a method of software development known as "microservice architecture" that has become popular in recent years also lends itself to this decentralized environment. "Microservice architecture" refers to a particular way of designing software applications as suites of independently deployable microservices. These microservices run in their own process and communicate with each other over a network to collectively fulfill a goal using technology-agnostic and lightweight protocols such as Hypertext Transfer Protocol (HTTP) with a bare minimum of centralized management. Microservices may be implemented using different programming languages, databases, or hardware and software environments, depending on what fits best for the specific microservice. Microservices may be small in size, messaging-enabled, autonomously developed, independently deployable, and built and released with automated processes. Because of these characteristics, it is common for microservices architectures to be adopted for cloud-native applications, serverless computing, and applications using lightweight container deployment, the very conditions that are prevalent in the 5G wireless and edge computing environment.

SUMMARY

An embodiment is directed to a computer-implemented method for predictively deploying microservices on edge devices in a network. The method may include running an application on a client device, the application comprising a set of microservices runnable on any edge device in a set of two or more edge devices.

The method may also include determining a state of the client device at a first time, where the state includes one or more microservices currently being run for the client device, and for each microservice currently being run, an edge device running the microservice. The determined state of the first client device may be transmitted to at least one edge device in the set of two or more edge devices.

In addition, the method may include predicting one or more microservices that are likely to be run at a second time subsequent to the first time. This may include determining, for each of the one or more microservices currently being run for the client device, a probability of a microservice not currently being run for the client device being requested by the client device when the respective microservice currently being run concludes and ranking the microservices in order of determined probability. A machine learning model may be used to determine a probability that a microservice not currently being run for the client device will be requested by the client device when a microservice currently being run concludes.

The method may further include predicting a location of the client device at the second time. Direction and speed of movement of the client device may be determined and a location of the client device at the second time may be predicted based on the determined direction and speed of movement of the client device.

The method may also include determining, based on the predicted location, a next edge device in the set of edge devices for running the one or more microservices predicted to be run at the second time. A first edge device as a candidate next edge device may be evaluated by determining a compute capacity of the first edge device, determining a workload of the first edge device, predicting a level of operational service if the predicted one or more microservices that are likely to be run are run at the second time on the first edge device and selecting the first edge device as the next edge device if the level of operational service is at or above a threshold level of operational service. In an embodiment, the first edge device may not be selected as the next edge device if the level of operational service is below a threshold level of operational service and a second edge device may be evaluated as the candidate next edge device.

Lastly, the method may include determining a time required to deploy the one or more microservices predicted to be run on the determined next edge device at the second time and initiating a deployment, at a third time, on the determined next edge device of the one or more microservices predicted to be run on the next edge device, the third time being prior to the second time, wherein the third time is determined based on the determined time required to deploy the one or more microservices predicted to be run on the determined next edge device. A compute capacity and workload of the determined next edge device may also be determined.

In addition to a computer-implemented method, additional embodiments are directed to a system and a computer program product for predictively deploying microservices on edge devices in a network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In an example wireless environment, there may be a number of software applications to be supported by the network infrastructure (repeaters and servers), with each application comprising of a set of microservices. In this scenario, it is important to have the microservices deployed and ready to run on the appropriate edge device (in this case, network repeater) at the time they are needed to process the data from the users. The edge device has limited computing capability so it is not feasible to have all the microservices of an application deployed and running at all edge devices. In order to meet the needs of all the users being served by the network, it is helpful to identify which microservices are deployed on which edge devices and at what time. It takes some time for a microservice to be deployed on an edge device and that time must be taken into account in determining when the microservice needs to be ready. There is a need to determine a probability that, given a number of network repeaters or edge devices with compute and bandwidth capacity, a specific microservice is likely to be needed next at a specific edge device.

Figure 1:
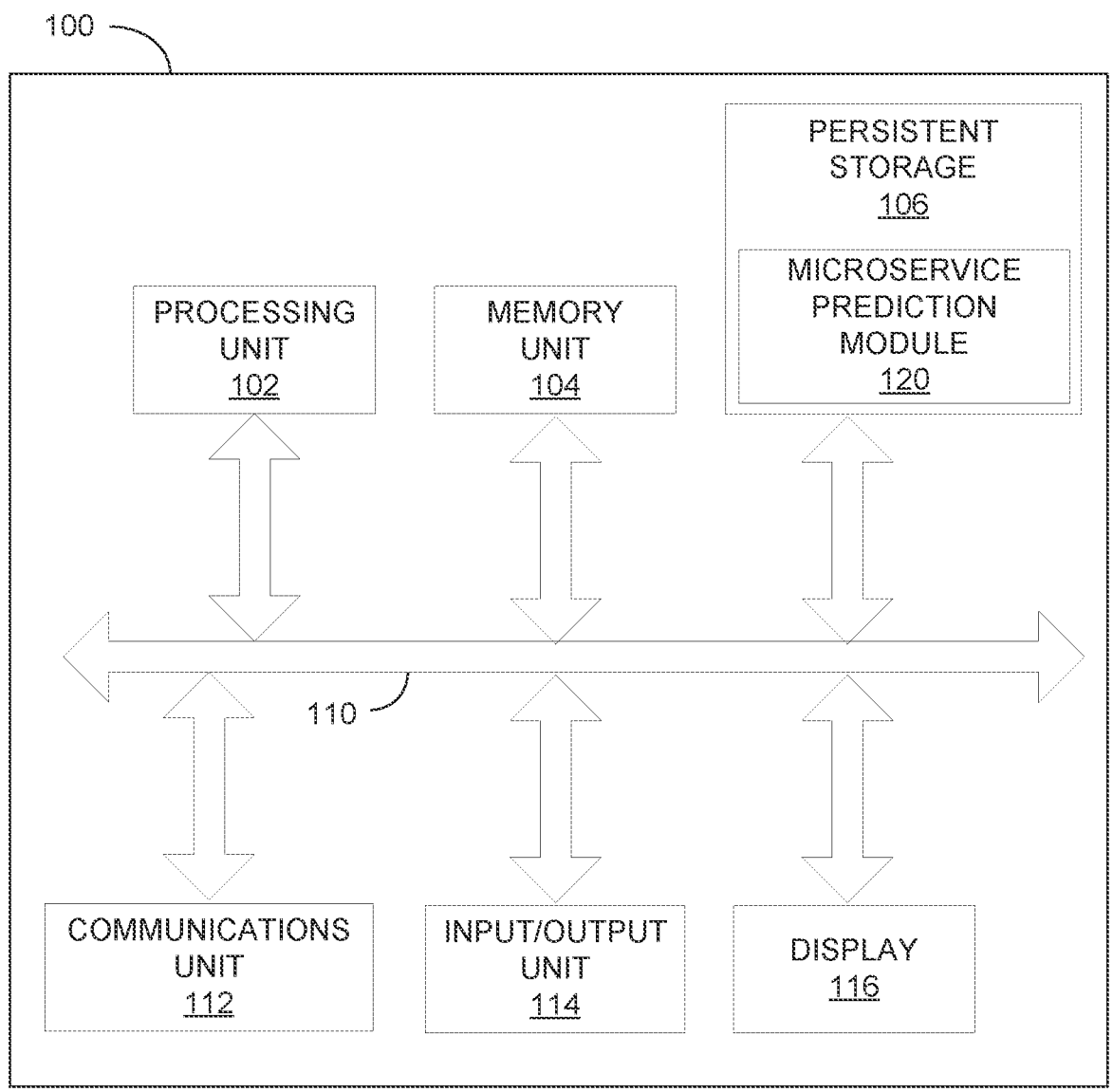
FIG. 1 is a block diagram of an example computer system in which various embodiments may be implemented.

Referring now to FIG. 1, there is shown a block diagram illustrating a computer system 100 which may be embedded in an edge server in an embodiment. In another embodiment, the computer system 100 may be embedded in a network repeater such as a cell tower or 5G microcell. In yet another embodiment, the computer system 100 may be embedded in a client device or mobile client device, examples of which include: a mobile phone, smart phone, tablet, laptop, a computing device embedded in a vehicle, a wearable computing device, virtual or augmented reality glasses or headset, and the like. As shown, a computer system 100 includes a processor unit 102, a memory unit 104, a persistent storage 106, a communications unit 112, an input/output unit 114, a display 116, and a system bus 110. Computer programs such as the microservice prediction module 120 may be stored in the persistent storage 106 until they are needed for execution, at which time the programs are brought into the memory unit 104 so that they can be directly accessed by the processor unit 102. The processor unit 102 selects a part of memory unit 104 to read and/or write by using an address that the processor 102 gives to memory 104 along with a request to read and/or write. Usually, the reading and interpretation of an encoded instruction at an address causes the processor 102 to fetch a subsequent instruction, either at a subsequent address or some other address. The processor unit 102, memory unit 104, persistent storage 106, communications unit 112, input/output unit 114, and display 116 interface with each other through the system bus 110.

Figure 2:
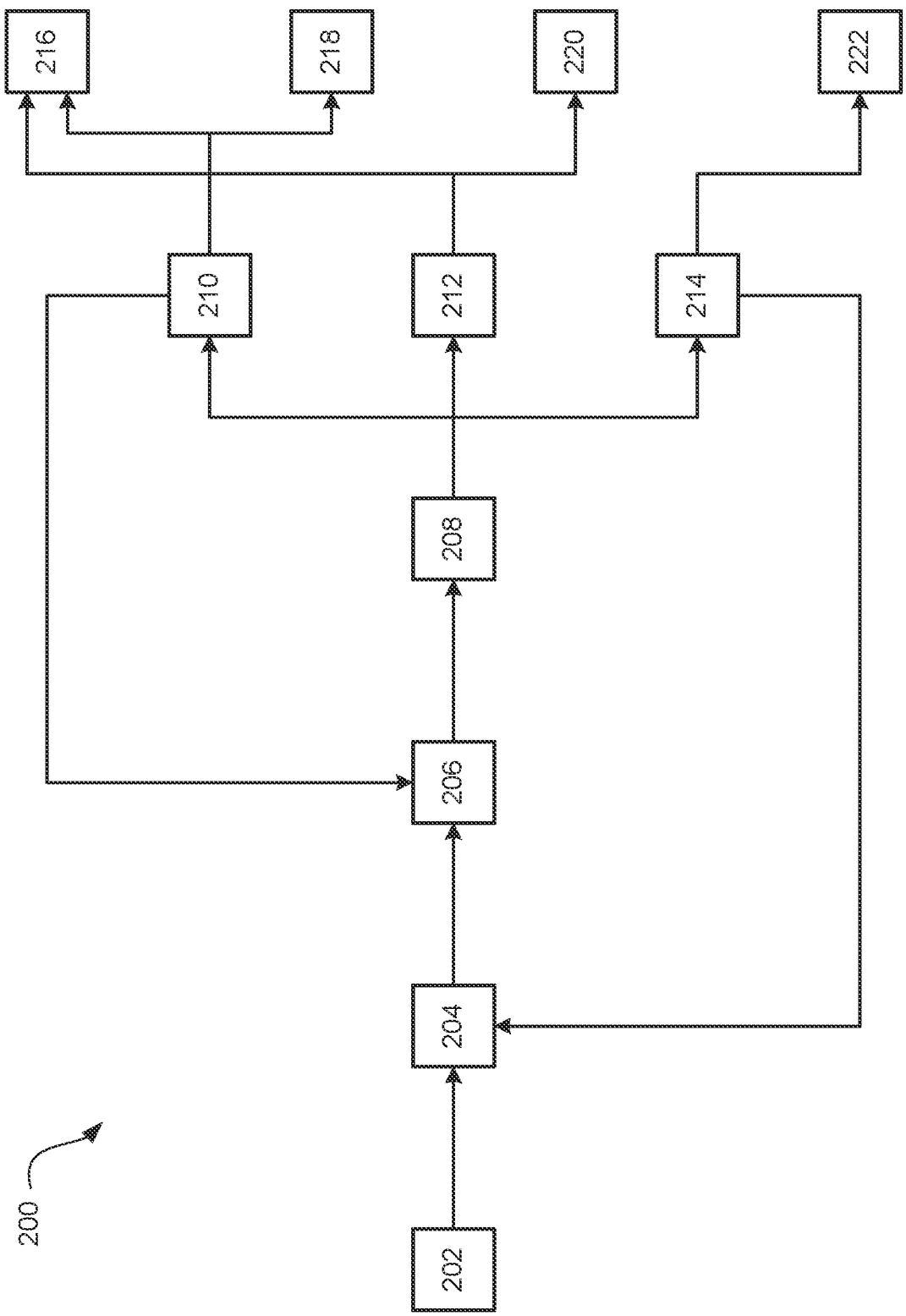
FIG. 2 depicts an example microservices interaction diagram according to an embodiment.
Figure 4:
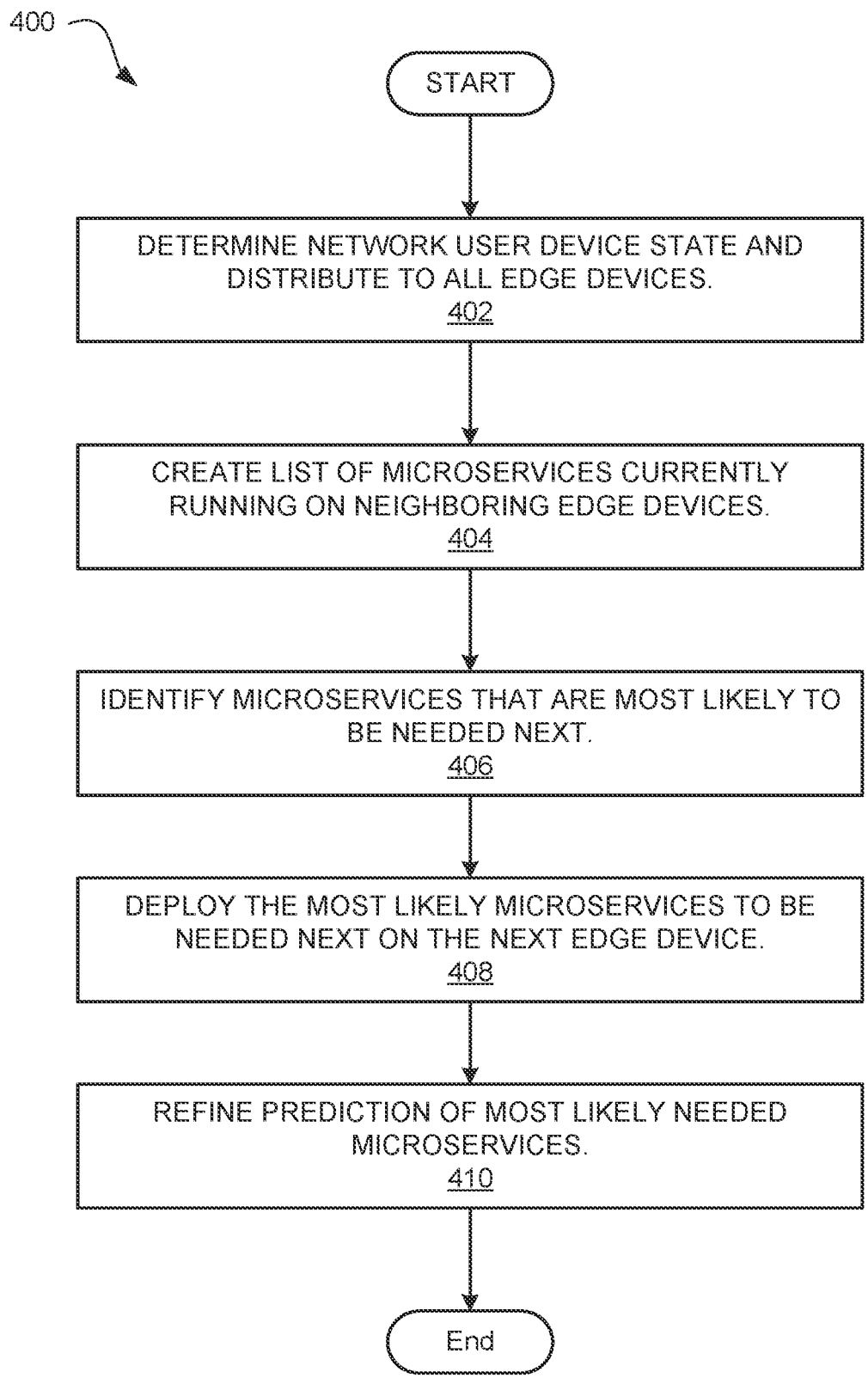
FIG. 4 is a flow chart diagram of a microservice prediction process in a mobile wireless network architecture in accordance with one or more embodiments.

Referring to FIG. 2, a diagram depicting an example microservices interaction is shown that will be used in conjunction with FIG. 4 as an example illuminating the process. In this example, microservices 202-222 of an example application may initially run in a particular order but after an initial period, different microservices may get triggered at different points based on the actions of the users so there is no unique order for how the microservices get triggered. The microservice prediction module 120 may predict which microservice(s) are most likely to be needed at a given edge device D at time T and may start the act of deploying such microservices so they are ready for execution when needed.

Figure 3:
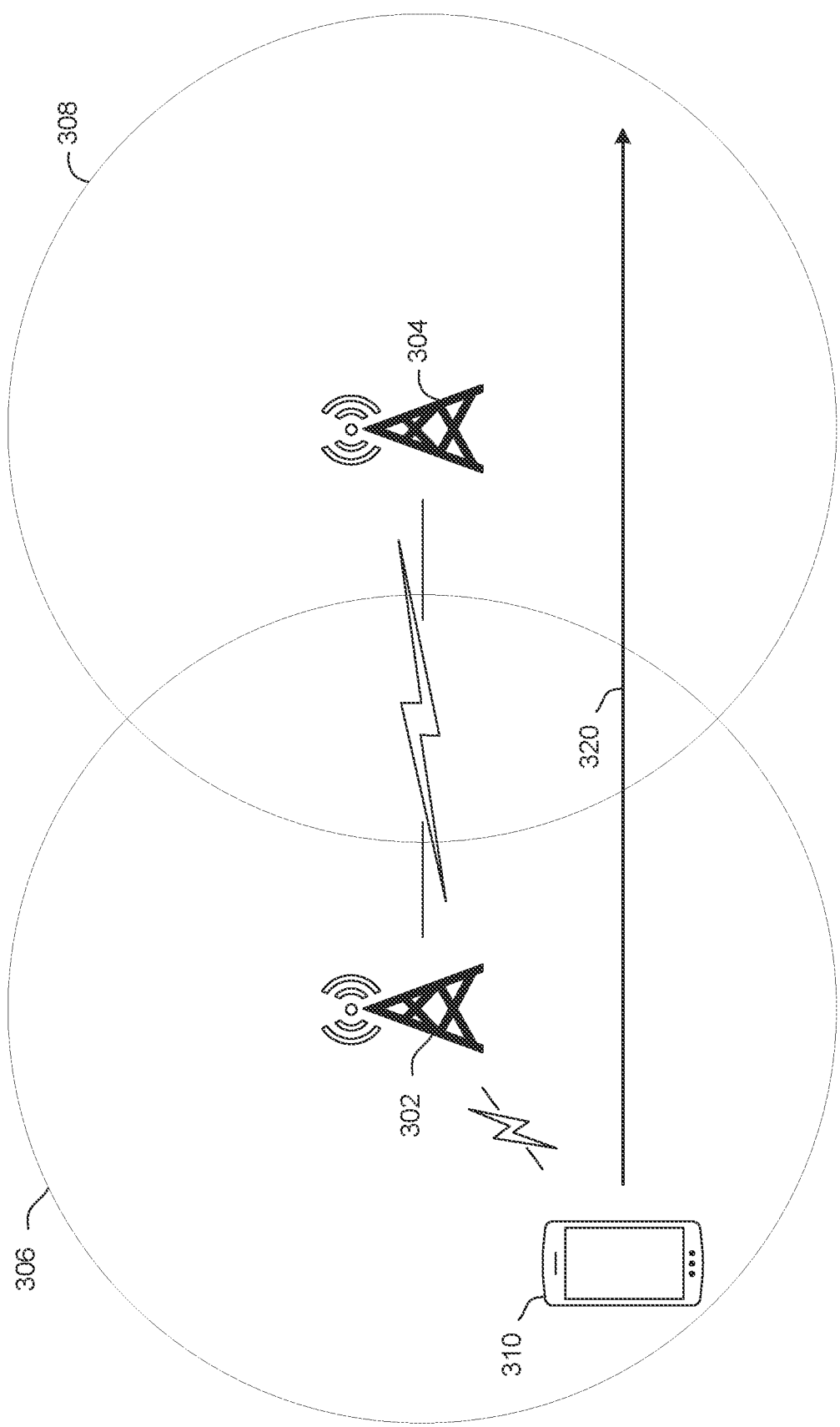
FIG. 3 depicts an example mobile wireless network with a client device traveling between edge devices according to an embodiment.

Referring to FIG. 3, an example mobile wireless network is depicted. Client device 310 is shown within the range 306 and communicating with the current edge device 302 while moving in the direction 320 into the range 308 of the next edge device 304. While a mobile phone is depicted as an example of a client device in FIG. 3, it should be appreciated that client device 310 may be any mobile device, such as a mobile phone, smart phone, tablet, laptop, a computing device embedded in a vehicle, a wearable computing device, virtual or augmented reality glasses or headset. In addition, while edge nodes 302, 304 are depicted as cell towers, it should be appreciated that a vehicle, such as a vehicle having a containerized entertainment system, may be an edge node. As the client device 310 moves out of range 306 of the current edge device 302 and into the range 308 of the next edge device 304, the current edge device 302 will hand off communications to the next edge device 304. The current edge device 302 and the next edge device 304 are said to be "neighboring" edge devices. In this example, the microservices that are calculated by the microservice prediction module 120 to be likely to be needed next may be deployed on the next edge device 304 in advance of the handover. It should be appreciated by one of skill in the art that for simplicity of illustration, FIG. 3 shows only one current edge device, one next edge device and a single client device moving in a single direction but in practice, a single edge device may service several client devices at once that are moving in more than one direction and a single current edge device may have multiple neighboring edge devices that will act as the next edge device.

Referring to FIG. 4, a flow chart of a prediction process 400 for deploying the needed microservices is depicted. In various embodiments, some or all of the operations of this process may be performed by an edge server or edge device. In other embodiments, some or all of the operations of this process may be performed by a mobile network repeater.

At 402, the microservice prediction module 120 may determine and distribute (or transmit) to all edge devices (D) a state (ST) for each client device (i), where the state captures which edge device the client device is currently connected to and which microservice(s) the client device is currently running, e.g., at a first time. Referring to the microservices shown in the example of FIG. 2, and given N client devices, the state of client device i=1 is ST1={D1, 202}, which indicates that client device 1 is currently connected to edge device D1 and currently running microservice 202 (which could be an authentication microservice as an example). The state of client device i=2 is ST2={D4, 202}, which indicates that client device 2 is currently connected to device D4 and is currently running microservice 202. It should be noted that this example references one microservice per user state for simplicity, but the same edge device may run multiple microservices for a single client device per state, e.g., ST3={D1, 206, 216}. In addition, a single edge device may simultaneously run the same microservice for two or more client devices, e.g., ST1={D1, 202} and ST5={D1, 202}.

At 404, the microservice prediction module 120 may collect from neighboring edge devices which client devices they are serving. The result would be a list of client devices and their corresponding states. For example, the list of client devices for an edge device Dj may be {U1, U4, U8, U9, . . . } and the corresponding states for these client devices on edge device Dj may be {ST1, ST4, ST8, ST9, . . . }. From these lists of client devices served at the neighboring edge devices and their states, the microservice prediction module 120 may extract the microservices currently being run, e.g., at the first time. For example, if the state for client device 1 indicates microservice 206 and the state for client device 2 indicates microservice 204, then the list of microservices being run on that edge device includes 204, 206 and so on. A sample list of microservices being run on edge device Dj may be {204, 206, 210, 206, 204, 214, . . . }. It should be noted that the same microservice may show up multiple times, i.e., if different client devices are served by neighboring devices running the same microservice.

At 406, the microservice prediction module 120 may identify (or predict) the microservices likely to be run next based on the list of microservices currently being run. Initially, this may be based on a fixed configuration setting but subsequently and over time, the prediction may be refined according to actual execution, as described below in 410. As an example, the list of microservices currently running may include 3 occurrences (or instances) of 204 (corresponding to 3 client devices currently using 204), 1 occurrence of 206, and 5 occurrences of 214. In this case, the microservice prediction module 120 may determine that the next most likely microservices are 222 and 204 each with probability $p=(5/9)*(1/2)$, where 5/9 is based on the number of occurrences of 214 and 1/2 is based on the example of FIG. 2, where the initial assumption is that 222 or 204 will run after 214 with equal probability. Also in this list of most likely microservices to run next may be 206 with probability $p=(3/9)*1$, where 3/9 is based on the number of occurrences of 204 and 1 is based on the example of FIG. 2, where only 206 is run after 204, and 208 with probability $p=(1/9)*1$, where 1/9 is based on the number of occurrences of 206 and 1 is based on the example of FIG. 2, where only 208 is run after 206.

In addition to predicting the likely microservices to be run next at step 406, the microservice prediction module 120 may also predict a likely location of the client device by determining the direction and speed of movement of the client device (or a vehicle in which a user of the client device is located) in order to select a suitable next edge device 304. The microservice prediction module 120 also predicts the time at which the client device 310 is predicted to be within communication range (or handoff range) of the suitable next edge device 304 based on the direction and speed of movement of the client device. Accordingly, the microservice prediction module 120 may predict one or more microservices that are likely to be run at a second time subsequent to the first time and a location of the client device at the second time. Further, the microservice prediction module 120 may determine, based on the predicted location, a next edge device in the set of edge devices for running a microservice predicted to be run at the second time, and may determine a time required to deploy the microservice predicted to be run on the determined next edge device at the second time.

At 408, the microservice prediction module 120 may deploy microservices on a next edge device 304 in accordance with the predictions of the previous step and consistent with the potential computing or memory or bandwidth limitations of the edge device that are calculated at this step. Each next edge device 304 may compute the start-up time required to load each individual microservice, which may differ by edge device since edge devices may be heterogeneous, both in terms of hardware and software, and workloads. For instance, the time that is required for a specific microservice to load on a cell tower may be very different from that of a 5G microcell. Different edge devices may have different types and numbers of processors, different amounts and types of memory, and different types and versions of software. Moreover, the startup time for a particular microservice on a particular edge device at a particular time may depend on the amount of other processing currently being performed on the edge device at that time. Start-up time also depends on attributes of the particular microservice, such as size of the code and libraries required. The computation of startup time may account for some or all of these factors. A table such as the following may be computed:

| Microservice | Edge Device | Start-up Time |
| --- | --- | --- |
| 202 | D1 | 20 msec |
| 204 | D1 | 40 msec |
| 204 | D4 | 35 msec |
| 208 | D3 | 20 msec |

Once the microservice prediction module 120 has computed a startup time, it may initiate the deployment of the microservice at an appropriate time so that the microservice is available in time for a potential handover of the communication session from the current edge device 302 to the next edge device 304. Accordingly, deployment of a microservice predicted to be run may be initiated at a third time on a next edge device (the third time being prior to the second time and determined based on the time required to deploy the microservice predicted to be run on the next edge device). In the example above, microservice 204 has a startup time of 40 msec on edge device D1 so if microservice 204 is predicted to be needed next and the next edge device 304 is determined to be edge device D1, the microservice prediction module 120 must initiate deployment of microservice 204 on edge device D1 at least 40 msec in advance of the client device 310 reaching next edge device 304 (which is also edge device D1 in the example). As mentioned, the time at which the client device 310 is predicted to reach or be within hand off range of a next edge device 304 may be determined at 406.

In addition, if it were determined that the next edge device 304 is capable of deploying 10 microservices, the next edge device 304 would deploy the 10 most likely to be needed. In the example environment of FIG. 2, the system would deploy 3 instances of 222 and 3 instances of 204 to serve the 5 client devices currently using 214, 3 instances of 206 to serve the client devices currently using 204 and one instance of 208 to serve the client device currently using 206. It should be appreciated by one of skill in the art that for simplicity of illustration, this example assumes a one-to-one correlation between instance of microservices and users but in practice, one instance of a microservice may service a large number of users. In another embodiment, an optional step may be added to handle cases when a device can only support a number of microservices that is not adequate to serve the needs for all users connected to the device. For example, the prediction may determine that an edge device needs to deploy 15 microservices as they are most likely to be needed by all client devices but the edge device only has capacity for 10. In this case, the remaining 5 microservices may be dispatched to other neighboring edge devices which could support the client devices and a prioritization or assignment scheme may be proposed to handle the microservices in that scenario. In this alternative, the startup time and the time at which the client device 310 is predicted to reach or be within hand off range of the neighboring edge device 304 may be determined as described above.

Figure 5:
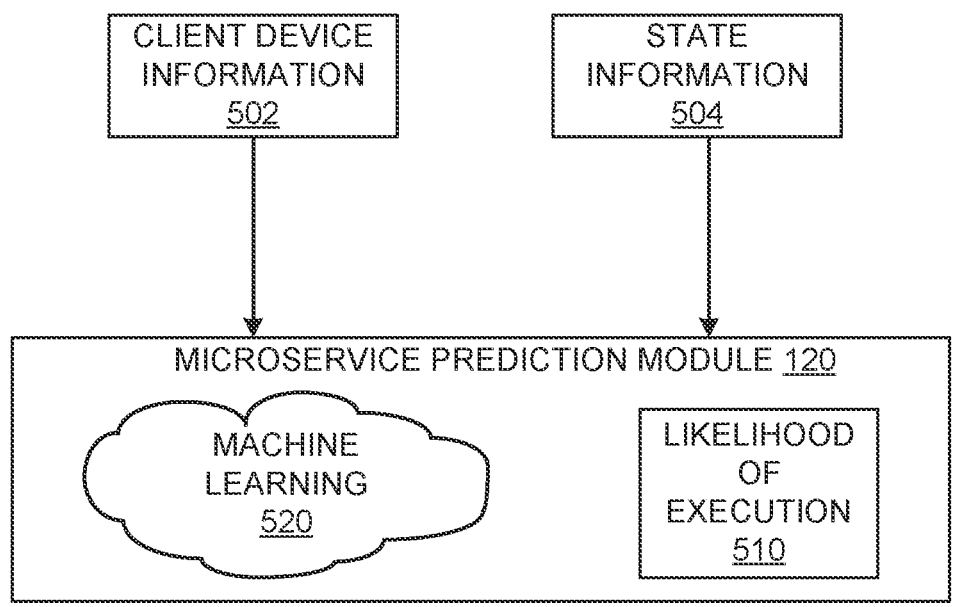
FIG. 5 shows a block diagram of the inputs and machine learning model of a microservice prediction module for determining the likelihood of a microservice being needed next in a mobile wireless network.

At 410, the microservice prediction module 120 may collect historical data about the client devices that are connected to the next edge device 304 and the microservices that are running on the next edge device and utilize a supervised machine learning model to develop a profile of the most likely microservices to run next and refine its prediction as described further in FIG. 5.

Referring to FIG. 5, a diagram showing examples of components or modules of a microservice prediction process according to at least one embodiment. According to one embodiment, the process may include microservice prediction module 120 which utilizes supervised machine learning 520 to determine the likelihood of a microservice to be needed next. The supervised machine learning model may use an appropriate machine learning algorithm, e.g., Support Vector Machines (SVM) or random forests. The microservice prediction module 120 monitors the actual execution of microservices as described in 410 and tracks the client device information 502, i.e., both the list of currently connected client devices from the neighboring edge devices and the list of client devices currently connected to the next edge device 404 and may also analyze current state information 504, i.e., the state that is received by all edge devices in 402. The microservice prediction module 120 may use the above information to determine the likelihood of execution 510 that a microservice will be needed next and updates the probabilities that are initially determined from the configuration file in step 210 above. For example, it may be discovered that users choose 222 following 214 80% of the time (as opposed to the 50% probability in the configuration file) and the microservice prediction module 120 may adjust to that change and update its prediction, or probability of likelihood, for the next microservice that is needed to run.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
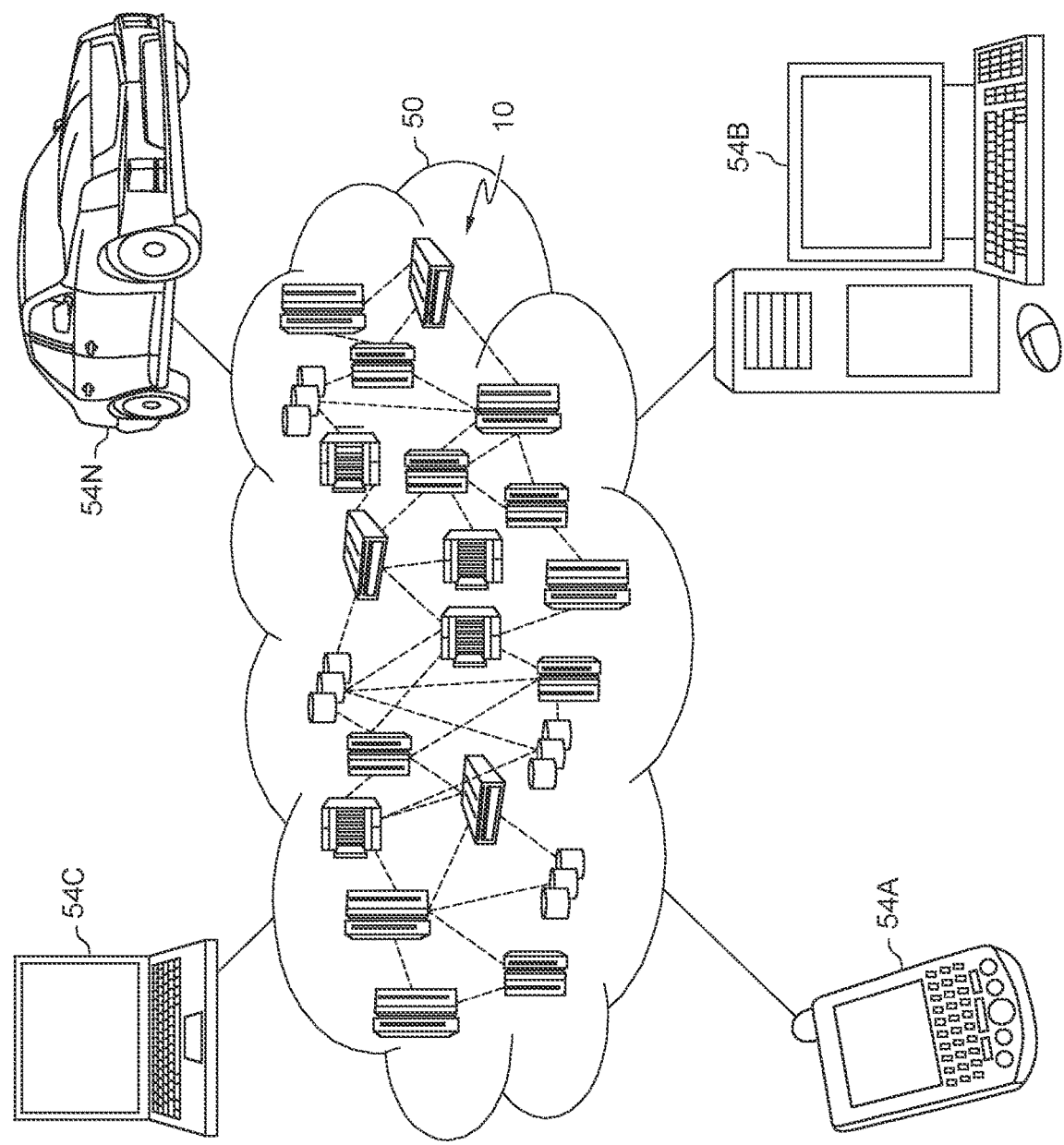
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
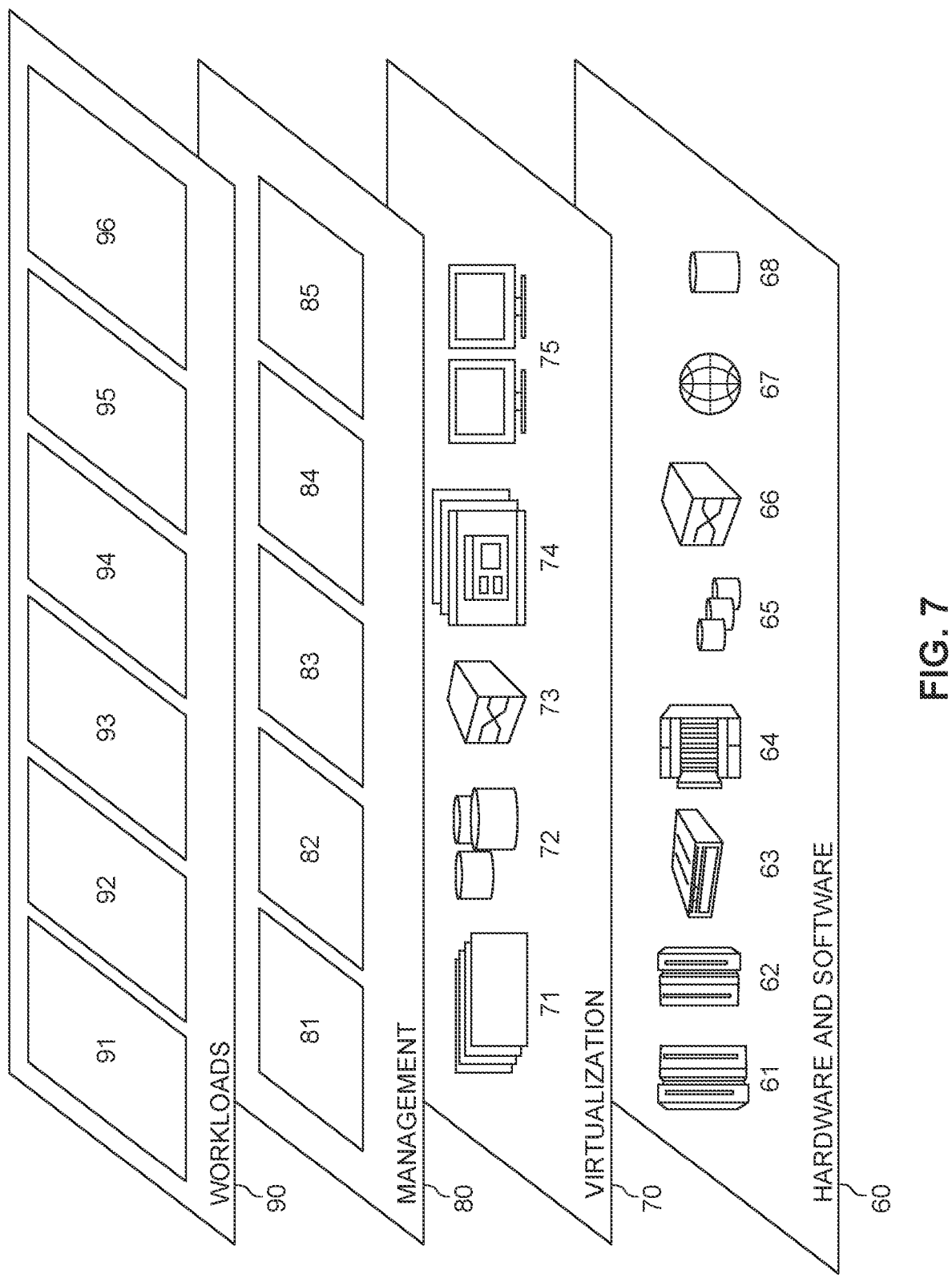
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and other applications 96 such as the microservice prediction module 120.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for predictively deploying microservices on edge devices in a network, the method comprising:
    deploying an application on a client device, the application comprising a set of microservices runnable on any edge device in a set of two or more edge devices;
    determining a state of the client device at a first time, wherein the state comprises a current microservice and an edge device associated with the client device, wherein the edge device is running the current microservice;
    predicting a likely microservice to be run at a second time subsequent to the first time;
    predicting a location of the client device at the second time; and
    determining a next edge device in the set of two or more edge devices for running the likely microservice based on the location of the client device and a capability level of the next edge device, wherein the capability level indicates that the likely microservice can run at the second time; and
    deploying the likely microservice on the next edge device.

2. The computer-implemented method of claim 1, wherein the determining the state of the client device at the first time further comprises:
    transmitting a determined state of the client device to at least one edge device in the set of two or more edge devices.

3. The computer-implemented method of claim 1, wherein the predicting the likely microservice to be run at the second time subsequent to the first time further comprises:
    determining, for each current microservice for the client device, a probability of a second microservice in the set of microservices being requested by the client device when the current microservice concludes; and
    ranking the set of microservices in order of a determined probability.

4. The computer-implemented method of claim 3, wherein a machine learning model is used to determine the probability that the second microservice in the set of microservices will be requested by the client device when the current microservice concludes.

5. The computer-implemented method of claim 1, wherein the predicting the location of the client device at the second time further comprises:
    determining a direction of the client device and a speed of movement of the client device; and
    predicting the location of the client device at the second time based on the direction of the client device and the speed of movement of the client device.

6. The computer-implemented method of claim 1, wherein the determining the next edge device in the set of two or more edge devices for running the likely microservice further comprises:
    evaluating a first edge device as a candidate next edge device by:
        determining a compute capacity of the first edge device;

determining a workload of the first edge device;
predicting the capability level when the likely microservice is run at the second time on the first edge device; and
selecting the first edge device as the next edge device when the capability level is at or above a threshold capability level.

7. The computer-implemented method of claim 6, further comprising:
not selecting the first edge device as the next edge device if when the capability level is below the threshold capability level; and
evaluating a second edge device as the candidate next edge device.

8. The computer-implemented method of claim 1, further comprising:
determining a required deployment time for the likely microservice on a determined next edge device; and
initiating a deployment, at a third time on the determined next edge device, of the likely microservice, the third time being prior to the second time, wherein the third time is based on the required deployment time for the likely microservice on the determined next edge device.

9. The computer-implemented method of claim 8, wherein the determining the required deployment time for the likely microservice on the determined next edge device further comprises:
determining a compute capacity of the determined next edge device; and
determining a workload of the determined next edge device.

10. A computer system for predictively deploying microservices on edge devices in a network comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
deploying an application on a client device, the application comprising a set of microservices runnable on any edge device in a set of two or more edge devices;
determining a state of the client device at a first time, wherein the state comprises a current microservice and an edge device associated with the client device, wherein the edge device is running the current microservice;
predicting a likely microservice to be run at a second time subsequent to the first time;
predicting a location of the client device at the second time; and
determining a next edge device in the set of two or more edge devices for running the likely microservice based on the location of the client device and a capability level of the next edge device, wherein the capability level indicates that the likely microservice can run at the second time; and
deploying the likely microservice on the next edge device.

11. The computer system of claim 10, wherein the determining the state of the client device at the first time further comprises:
transmitting a determined state of the client device to at least one edge device in the set of two or more edge devices.

12. The computer system of claim 10, wherein the predicting the likely microservice to be run at the second time subsequent to the first time further comprises:
determining, for each current microservice for the client device, a probability of a second microservice in the set of microservices being requested by the client device when the current microservice concludes; and
ranking the set of microservices in order of a determined probability.

13. The computer system of claim 12, wherein a machine learning model is used to determine the probability that the second microservice in the set of microservices will be requested by the client device when the current microservice concludes.

14. The computer system of claim 10, wherein the predicting the location of the client device at the second time further comprises:
determining a direction of the client device and a speed of movement of the client device; and
predicting the location of the client device at the second time based on the direction of the client device and the speed of movement of the client device.

15. The computer system of claim 10, wherein the determining the next edge device in the set of two or more edge devices for running the likely microservice further comprises:
evaluating a first edge device as a candidate next edge device by:
determining a compute capacity of the first edge device;
determining a workload of the first edge device;
predicting the capability level when the likely microservice is run at the second time on the first edge device; and
selecting the first edge device as the next edge device when the capability level is at or above a threshold capability level.

16. The computer system of claim 15, further comprising:
not selecting the first edge device as the next edge device when the capability level is below the threshold capability level; and
evaluating a second edge device as the candidate next edge device.

17. The computer system of claim 10, further comprising:
determining a required deployment time for the likely microservice on a determined next edge device; and
initiating a deployment, at a third time on the determined next edge device, of the likely microservice, the third time being prior to the second time, wherein the third time is based on the required deployment time for the likely microservice on the determined next edge device.

18. The computer system of claim 17, wherein the determining the required deployment time for the likely microservice on the determined next edge device further comprises:
determining a compute capacity of the determined next edge device; and
determining a workload of the determined next edge device.

19. A computer program product for predictively deploying microservices on edge devices in a network comprising:
a computer-readable storage device storing computer-readable program code embodied therewith, the computer-readable program code comprising program code executable by a computer to perform a method comprising:
- deploying an application on a client device, the application comprising a set of microservices runnable on any edge device in a set of two or more edge devices;
- determining a state of the client device at a first time, wherein the state comprises a current microservice and an edge device associated with the client device, wherein the edge device is running the current microservice;
- predicting a likely microservice to be run at a second time subsequent to the first time;
- predicting a location of the client device at the second time; and
- determining a next edge device in the set of two or more edge devices for running the likely microservice based on the location of the client device and a capability level of the next edge device, wherein the capability level indicates that the likely microservice can run at the second time; and
- deploying the likely microservice on the next edge device.

20. The computer program product of claim 19, wherein the determining the state of the client device at the first time further comprises:
- transmitting a determined state of the client device to at least one edge device in the set of two or more edge devices.

21. The computer program product of claim 19, wherein the predicting the likely microservice to be run at the second time subsequent to the first time further comprises:
- determining, for each current microservice for the client device, a probability of a second microservice in the set of microservices being requested by the client device when the current microservice concludes; and
- ranking the set of microservices in order of a determined probability.

22. The computer program product of claim 21, wherein a machine learning model is used to determine the probability that the second microservice in the set of microservices will be requested by the client device when the current microservice concludes.

23. The computer program product of claim 19, wherein the predicting the location of the client device at the second time further comprises:
- determining a direction of the client device and a speed of movement of the client device; and
- predicting the location of the client device at the second time based on the direction of the client device and the speed of movement of the client device.

24. The computer program product of claim 19, wherein the determining the next edge device in the set of two or more edge devices for running the likely microservice further comprises:
- evaluating a first edge device as a candidate next edge device by:
  - determining a compute capacity of the first edge device;
  - determining a workload of the first edge device;
  - predicting the capability level when the likely microservice is run at the second time on the first edge device; and
  - selecting the first edge device as the next edge device if when the capability level is at or above a threshold capability level.

25. The computer program product of claim 24, further comprising:
- not selecting the first edge device as the next edge device when the capability level is below the threshold capability level; and
- evaluating a second edge device as the candidate next edge device.

* * * * *